United States Patent
Scheider et al.

[11] Patent Number: 5,903,644
[45] Date of Patent: *May 11, 1999

[54] MONAURAL COMMUNICATION DEVICE

[75] Inventors: Josef Scheider, Vienna; Franz Hirtl, Enzesfeld; Horst Richter, Vienna, all of Austria

[73] Assignee: AKG Akustische U. Kino-Geräte Gesellschaft m.b.H., Vienna, Austria

[*] Notice: This patent issued on a continued prosecution application filed under 37 CFR 1.53(d), and is subject to the twenty year patent term provisions of 35 U.S.C. 154(a)(2).

[21] Appl. No.: 08/679,505

[22] Filed: Jul. 12, 1996

[30] Foreign Application Priority Data

Jul. 19, 1995 [AT] Austria ................. 394/95 U

[51] Int. Cl.⁶ ............. H04M 1/00; H04R 25/00
[52] U.S. Cl. ................. 379/430; 381/381
[58] Field of Search .............. 379/430; 381/381, 381/379, 374, 383, 385, 386, 390, 330

[56] References Cited

U.S. PATENT DOCUMENTS

| | | |
|---|---|---|
| 3,862,378 | 1/1975 | Norris . |
| 4,932,052 | 6/1990 | Lo . |
| 5,210,792 | 5/1993 | Kajihara . |
| 5,446,788 | 8/1995 | Lucey et al. . |

FOREIGN PATENT DOCUMENTS

| | | |
|---|---|---|
| 0423202 | 5/1995 | European Pat. Off. . |
| 3641612 | 6/1987 | Germany . |
| 3831207 | 4/1989 | Germany . |
| 4329635 | 3/1995 | Germany . |
| 2183963 | 6/1987 | United Kingdom . |
| 2210534 | 6/1989 | United Kingdom . |
| 9000340 | 1/1990 | WIPO . |

*Primary Examiner*—Jack Chiang
*Attorney, Agent, or Firm*—Friedrich Kueffner

[57] ABSTRACT

A monaural communication device is composed of a housing for receiving a receiver and a support component which is resiliently connected to the housing and is to be worn binaurally. The support component is constructed symmetrically and the housing and/or the support component is provided with grip elements which, when actuated, make it possible to fold or tilt the support component away from the housing by using the fingers of only one hand, and wherein, when the support component carries out a return movement by means of a spring, the support component clamps the pinna against the housing.

5 Claims, 2 Drawing Sheets

MONAURAL COMMUNICATION DEVICE

BACKGROUND OF THE INVENTION

1. Field of the Invention

The present invention relates to a monaural communication device composed of a housing for receiving a receiver and a support component which is resiliently connected to the housing and is to be worn binaurally.

2. Description of the Related Art

Monaural communication devices of the above-described type may be talk-listen sets or pure listening devices, as long as they are only used on one ear.

Monaural communication devices are used in many cases in which the continuous use of listening devices or talk-listen devices is necessary or desired, for example, by telephone operators, persons providing directory assistance, air traffic controllers, persons handling telephone orders or persons carrying out assemblies in the field of manufacturing; in short, monaural communication devices are used where the hands must be free during listening and speaking. As compared to binaural head sets and head set units, the thermal stress on the user is smaller. In addition, by being able to listen to surrounding noises, the feeling of isolation is eliminated.

A way of fastening these communication devices is by clamping them in the pinna. Talk-listen units can also be supported in this manner. For example, DE-OS 36 41 612 describes this type of talking unit.

Another way of fastening the communication devices is by placing a stirrup connected to the housing around the pinna. This stirrup may be closed, for example, ring-shaped, or the stirrup may be open toward the bottom. When the stirrup is suitably constructed, the communication devices can be worn optionally on the right ear or the left ear.

Because pinnae have different shapes, a mere placement or suspension of the communication devices on the ear enable only a loose fit on the ear. This frequently leads the wearer of the device to have the feeling that something is being lost; during quick head movements, it may actually occur that a portion of the communication is lost. If the communication device is moved relative to the ear duct as a result of a head movement, a change in the acoustics, particularly the loudness is perceived. This may lead to communication difficulties or to diversions, for example, when readjustments have to be carried out.

The exact positioning of the communication device is of particular importance when a talk-listen unit must be used. In that case, it is not only necessary to position the receiver correctly in front of the ear, but the microphone must also be correctly positioned relative to the mouth.

In order to ensure a uniform position under all circumstances, several possibilities have been proposed for securing the communication devices on the ear. For example, DE-OS 43 29 635 describes how a communication of this type can be clamped underneath the pinna my means of a lever. Also, a telescoping extension which surrounds the pinna for securing a talk-listen device has been proposed in DE-OS 38 31 207.

Resiliently mounted clamping devices have also become known. For example, it is proposed in U.S. Pat. No. 4,932, 052 to position a moveable component from the top behind the pinna in order to secure the receiver relative to the ear duct. As disclosed in EP 423 202 B1 and U.S. Pat. No. 5,210,792, another possibility is to construct a support stirrup resiliently fastened relative to the housing in such a way that the communication devices are securely positioned on the ear.

However, in all of these embodiments, it is not taken into consideration that the devices must be simple to operate. Especially in the case of resilient components, it is frequently not easy to place the communication device in the correct position relative to the ear. In these cases, it is necessary to use both hands to simultaneously hold the resilient clamping means open and to find the correct position relative to the ear. This problem becomes even more difficult when the user of the device has long hair, so that especially female users frequently find it difficult to place the communication device correctly.

SUMMARY OF THE INVENTION

Therefore, it is the primary object of the present invention to provide a monaural communication device in which the above-described disadvantages are eliminated.

In accordance with the present invention, the support component is constructed symmetrically and the housing and/or the support component is provided with grip elements which, when actuated, make it possible to fold or tilt the support component away from the housing by using the fingers of only one hand, and wherein, when the support component carries out a return movement by means of a spring, the support component clamps the pinna against the housing.

Consequently, in accordance with the present invention, the moveable components are constructed in such a way that the grip elements are formed in accordance with ergonomic requirements, so that the user can easily correctly position the communication device in front of the ear by using the fingers of only one hand. Thus, by providing suitable grip elements, it is possible by using one hand to open the clamping device as well as finding the correct position in front of the ear.

The support component is of symmetrical construction so that the communication device can be used on both ears. Of course, this makes it necessary that the grip elements are also constructed in such a way that they can be operated with the fingers of the left hand and the right hand.

If the communication device is a monaural talk-listen device, the microphone arm is fastened to the housing in a moveable manner, for example, in a rotatable manner, so that it is always possible to adjust an optimum position of the microphone in front of the mouth of the user.

Depending on the type of communication device to be clamped to the ear, the present invention provides that the ergonomic configuration can be carried out in different ways. For example, indentations can be provided for finding the optimum position of the fingers and to facilitate an exact sequence of movement as a result. However, it is also possible to provide component parts with raised areas at those locations which are to be engaged by the fingers, so that an increased friction occurs between fingers and component parts. This also provides an ergonomically favorable positioning and an optimum sequence of movements.

Of course, a combination of these features is also possible. It is not significant with respect to the present invention as to how the clamping action is effected.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
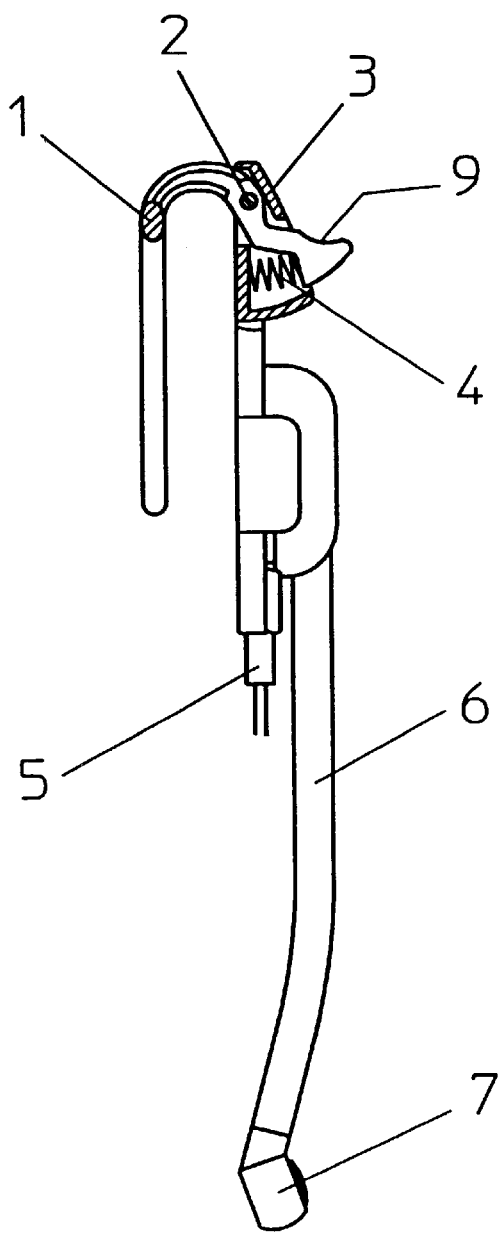
FIG. 1 is an elevational view of a monaural head set with a clamping device including a compression spring.

A first embodiment of the present invention is shown in FIG. 1. A support component 1 is moveably fastened through the axis 2 to the housing 3. The resilient connection to the housing is effected through a compression spring 4. The receiver is mounted in the housing 3 and is electrically connected through a line 5. The microphone arm 6 including the microphone 7 is rotatably mounted in the housing 3. A grip element in the form an indentation 9 to be engaged by a finger is provided on the support component 1.

Figure 3:
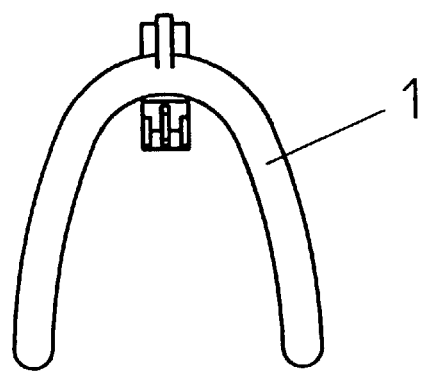
FIG. 3 is a side view of a symmetrical suspension component.

A symmetrical configuration of the support component 1 is shown in FIG. 3.

Figure 2:
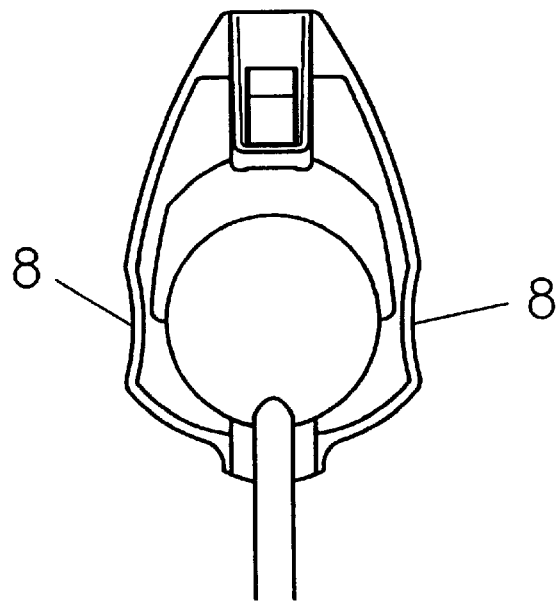
FIG. 2 is an illustration of an embodiment including indentations of the housing.

FIG. 2 shows grip elements in the form of indentations 8 in the housing 3.

Figure 4:
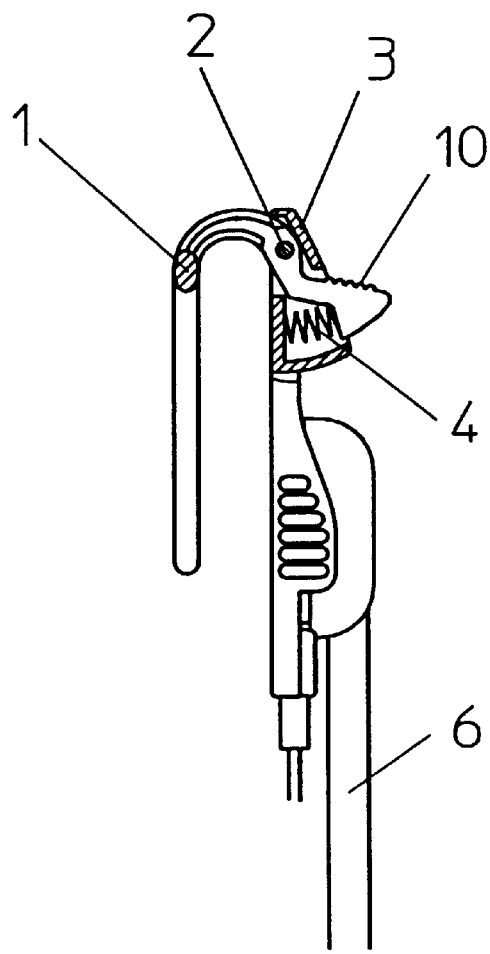
FIG. 4 is an illustration of an embodiment with raised areas on the support component.

The configuration of the grip elements on the support component 1 in the form of raised areas 10 is shown in FIG. 4. On the housing 3, the grip elements are constructed in the form of raised areas 11.

Figure 5:
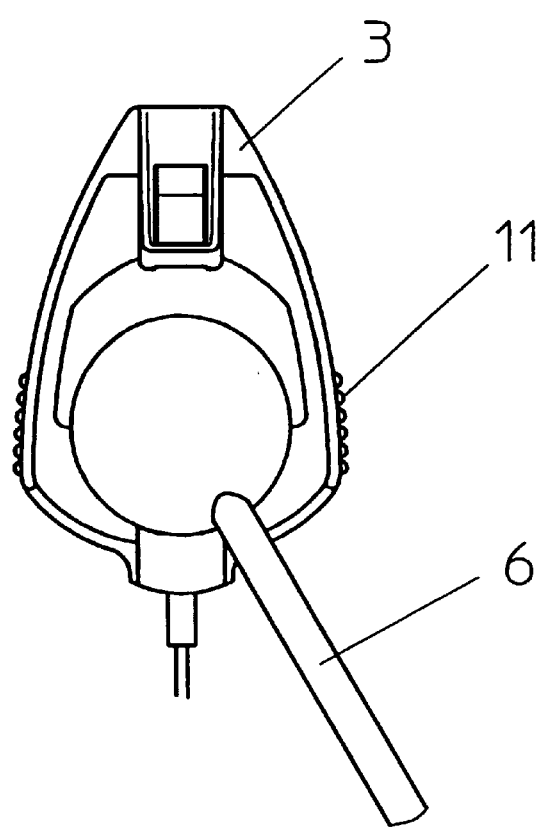
FIG. 5 is an illustration of an embodiment with raised areas on the housing.

FIG. 5 of the drawing shows the microphone arm 6 in a rotated position which corresponds approximately to the position of use when the monaural talking unit is worn on the right ear.

While specific embodiments of the invention have been shown and described in detail to illustrate the inventive principles, it will be understood that the invention may be embodied otherwise without departing from such principles.

We claim:

1. A monaural communication device comprising a housing, a receiver in the housing and a support component connected to the housing, wherein the support component is symmetrical and is constructed to be worn over both ears, wherein the support component is foldable relative to the housing about an axis extending parallel to the support component between a folded-out position and a folded-in position, further comprising a spring connected to the support component and the housing for biasing the support component toward the housing into the folded-in position.

2. The monaural communication device according to claim 1, further comprising grip elements provided at least on one of the housing and the support component for effecting folding of the support component relative to the housing, wherein the grip elements are indentations.

3. The monaural communication device according to claim 1, further comprising grip elements provided at least on one of the housing and the support component for effecting folding of the support component relative to the housing, wherein the grip elements are raised areas.

4. The monaural communication device according to claim 1, comprising a microphone arm rotatably fastened to the housing.

5. A monaural communication device comprising a housing, a receiver in the housing and a support component resiliently connected to the housing through a spring, wherein the support component is symmetrical and is constructed to be worn over both ears, further comprising grip elements provided on at least one of the housing and the support component, wherein the support component is foldable relative to the housing about an axis extending parallel to the support component between a folded-out position and a folded-in position, whereby the support component can be moved into the folded-out position by the engagement of fingers of only one hand in the grip elements, wherein, in the folded-in position of the support component, the support component clamps the pinna against the housing, and wherein the spring biases the support component toward the housing into the folded-in position.

\* \* \* \* \*